United States Patent
Cheng et al.

(10) Patent No.: US 8,606,724 B2
(45) Date of Patent: Dec. 10, 2013

(54) POLICY EVOLUTION WITH MACHINE LEARNING

(75) Inventors: Pau-Chen Cheng, Yorktown Heights, NY (US); John Andrew Clark, York (GB); Yow Tzu Lim, York (GB); Pankaj Rohatgi, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 12/266,198

(22) Filed: Nov. 6, 2008

(65) Prior Publication Data

US 2010/0332422 A1    Dec. 30, 2010

(51) Int. Cl.
G06F 15/18    (2006.01)
G06F 17/00    (2006.01)
G06N 3/00    (2006.01)
G06N 3/12    (2006.01)
G06N 5/00    (2006.01)

(52) U.S. Cl.
USPC .................. 706/12; 706/13; 706/45

(58) Field of Classification Search
None
See application file for complete search history.

(56) References Cited

U.S. PATENT DOCUMENTS

| | | | | |
|---|---|---|---|---|
| 7,356,187 | B2 * | 4/2008 | Shanahan et al. | 382/224 |
| 7,386,527 | B2 * | 6/2008 | Harris et al. | 706/59 |
| 7,574,409 | B2 * | 8/2009 | Patinkin | 706/12 |
| 2008/0281764 | A1 * | 11/2008 | Baxter | 706/12 |

OTHER PUBLICATIONS

Yi Liu; Zheng, Y.F.; , "One-against-all multi-class SVM classification using reliability measures," Neural Networks, 2005. IJCNN '05. Proceedings. 2005 IEEE International Joint Conference on , vol. 2, No., pp. 849-854 vol. 2, Jul. 31-Aug. 4, 2005.*

Mendes, Roberto; de Voznika, Fabricio; Freitas, Alex; Nievola, Julio. "Discovering Fuzzy Classification Rules with Genetic Programming and Co-evolution," Principles of Data Mining and Knowledge Discovery pp. 314-325 (2001).*

Debnath, R.; Takahide, N.; Takahashi, H.. "A decision based one-against-one method for multi-class support vector machine," Pattern Analysis & Applications vol. 7, No. 2 pp. 164-175 (2004).*

C. Thiel, S. Scherer, and F. Schwenker, "Fuzzy-input fuzzy-output one against-all support vector machines," in Proc. 11th Int. Conf. Knowledge-Based Intell. Inf. Eng. Syst., 2007, vol. 4694, pp. 156-165.*

* cited by examiner

*Primary Examiner* — Kakali Chaki
*Assistant Examiner* — Daniel Pellett
(74) *Attorney, Agent, or Firm* — F. Chau & Associates, LLC; Preston J. Young (57) ABSTRACT

A method for constructing a classifier which maps an input vector to one of a plurality of pre-defined classes, the method steps includes receiving a set of training examples as input, wherein each training example is an exemplary input vector belonging to one of the pre-defined classes, learning a plurality of functions, wherein each function maps the exemplary input vectors to a numerical value, and determining a class for the input vector by combining numerical outputs of the functions determined for the input vector.

18 Claims, 4 Drawing Sheets

POLICY EVOLUTION WITH MACHINE LEARNING

STATEMENT OF GOVERNMENT RIGHTS

This invention was made with Government support under Contract No.: W911NF-06-3-0001 awarded by the U.S. Army. The Government has certain rights in this invention.

BACKGROUND

1. Technical Field

The present invention relates generally to the machine learning and more specifically to learning security policies with machine learning techniques.

2. Discussion of Related Art

Research on machine learning has been conducted for many years and significant accomplishments have been achieved. However, there is still one basic constraint, which may be stated as "A machine cannot learn what is not provided to it." For a particular machine learning exercise to produce good results, a diverse enough set of training input examples covering an entire space of interest needs to be provided. This set of input examples are typically called the training set. Diversity in the training set means the set contains enough information to be learned so the learning process could produce a desirable result. For example, if the goal is to learn a five-class classifier but the training set contains no examples of class 3, then the learning process would not even know there is a class 3.

In computer systems, a policy was a set of rules with a clear intuitive motivation that could be formalized to good effect. The word can also denote more complex rules, e.g., for risk decisions, etc. Previous research on policy transformation has demonstrated that automated tools can transform high-level human-understandable policy rules to low-level machine executable rules. There also have been attempts on using machine learning on issues related to information processing systems, such as learning patterns of intrusions to information processing systems and learning network routing policies. However, there have been no known attempts at automatically generating a security policy for an information processing system from previous decision examples using machine learning techniques, especially when the examples are not diverse enough.

Therefore, a need exists for a system and method for learning security policies from previous decision examples since human beings are generally much better at making specific decisions from specific inputs than writing generalized, abstract policies.

BRIEF SUMMARY

According to an embodiment of the present disclosure, a method for constructing a classifier which maps an input vector to one of a plurality of pre-defined classes, the method steps includes receiving a set of training examples as input, wherein each training example is an exemplary input vector belonging to one of the pre-defined classes, learning a plurality of functions, wherein each function maps the exemplary input vectors to a numerical value, and determining a class for the input vector by combining numerical outputs of the functions determined for the input vector.

According to an embodiment of the present disclosure, a method for constructing a classifier for mapping an input vector to one of a plurality of pre-defined classes includes receiving a set of training examples, wherein each training example is an exemplary input vector belonging to one of the pre-defined classes, learning a plurality of functions, wherein each function maps the exemplary input vectors to a numerical value by a curve characterized by elements in the training examples, and determining a class among the pre-defined classes for the input vector by combining numerical outputs of the functions determined for the input function.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, machine learning for an N-class classifier may be implemented in an environment that does not provide examples for all possible mappings from different inputs to different classes. According to an embodiment of the present disclosure, a method for determining a policy with machine learning includes receiving an input of training sets, learning a plurality of classifier functions through curve fitting, wherein each classifier function maps a vector in the training set to a set of one or more classes to which the vector most likely belongs, and determining a class for the vector according to a combined output of the classifier functions. The policy is a mapping from an input vector to a class, and the class represents a decision made under the policy given the input vector.

An exemplary method may be formulated as follows: A vector with m elements $v = \langle v_1 \ldots v_m \rangle$ can be classified as belonging to one of N classes, depending on the values of its elements. At block 101 in FIG. 1, a training set is input whose elements are of the form (v, c), where c is the class for v. It is assumed that there is a total ordering among the N different classes $c_1 \ldots c_N$ such that $c_i$ comes before $c_j$ if $i<j$, and that a transition between two adjacent classes happens as the values of vector elements change.

Figure 1:
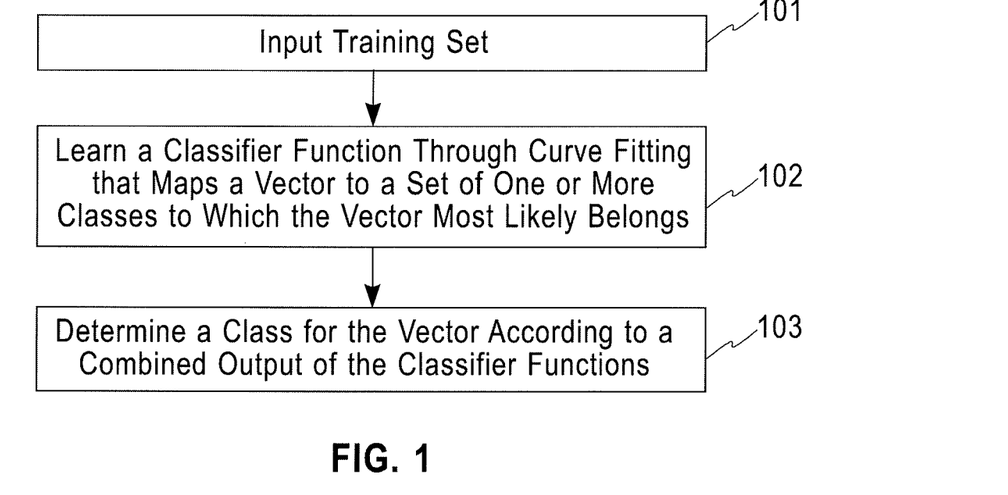
FIG. 1 is a flow chart of a method for determining a policy with genetic programming (which is a machine learning technique) according to an embodiment of the present disclosure.

At block 102 in FIG. 1, instead of learning a classifier that maps a vector v to a discrete value that represents the class c to which v belongs, the learning exercise is treated as a curve fitting exercise. The mapping is represented by a curve characterized by elements in the training set. If a sequence of N values $e_1 \ldots e_N$ is assigned to classes $c_1 \ldots c_N$ such that $e_i < e_j$ if $i<j$, then each element (v, c) in the training set is represented by a point $(v, e_c)$ on the curve. The goal of the exercise is to learn a function $f(v)$ that is a best-fit for all these points. The best-fit may be defined as a function $f(v)$ as close to the curve as one could get using the examples/knowledge contained in the training set. Curve fitting is tolerant of missing points because it can compensate by interpolation or extrapolation. In this example, missing points correspond to missing knowledge in the training set. Curve fitting also has the added benefit of being tolerant of a few out-liars. Instead of learning just one function $f$, learn many functions such that each function is independently learned and has its own unique $e_1 \ldots e_N$ sequence of values. For example, a function $f_k$ may be learned for a class k using an $e_1 \ldots e_N$ sequence unique to k; and N such functions are learned for all N classes. The output $f(v)$ of a function $f$ from input v gives an indication to which class or classes v most likely belongs from $f$'s perspective. At block 103, to determine the class to which a vector v belongs, use v as input to all functions and use their outputs ($f(v)$) to determine the class to which v belongs.

The class to which v belongs may be determined by different methods using the outputs from all the learned functions. In one example, a majority voting method can be implemented. Since each function is learned independently of the others, this approach is analogous to examining v from different angles to reach a final conclusion. Thus, it may be more accurate than using the output of just one function.

The following example builds an N-class classifier, assuming N=10 and the classes are numbered from 1 to 10.

(1) For each class k (i) determine the unique $e_1 \ldots e_N$ sequence for the function $f_k$.

For example, for a class k, the numbers in the sequence may be ((class number)-k). Thus, for class 5, elements in the sequence would be ((class number)-5), so $(e_1, e_2 \ldots e_{10})=(-4, -3, -2, -1, 0, 1, 2, 3, 4, 5)$ Note that $e_5$ equals 0.

(ii) use machine learning techniques to learn the function $f_k$ characterized by the sequence for class k.

(2) Design and build a decision-maker such that it will take as input the output values of all 10 functions and outputs a class number, an integer between 1 and 10.

This definition should only be considered as an exemplary embodiment. It is given here solely for the purpose of illustration. The following example of a decision-maker is given as a program in pseudo-code. The exemplary pseudo-code is a majority-voting method. The function floor (u) returns the maximum integer that is less than or equal to u. The function ceil(u) returns the minimum integer that is greater than or equal to u.

Assuming N=10, initialize an array a[10] with all elements set to 0, the index of the array starts from 1
for an input v do
    for each and every class k do

```
if ( f_k(v) > 0.5 ) then
    p ← k + f_k(v)
    j ← minimum( floor(p + 0.5), 10 )
    a[j] ← a[j] + 3
    if ( j > p ) then
            if ( j >1 ) then a[j – 1] ← a[j – 1] + 2 endif
            a[j + 1] ← a[j + 1] + 1
    else
            if ( j > 1) then a[j – 1] ← a[j – 1] + 1 endif
            a[j + 1] ← a[j + 1] + 2
    endif
else if (f_k(v) < –0.5 ) then
    p ← k + f_k(v)
    j ← maximum( ceil(p – 0.5), 1 )
    a[j] ← a[j] + 3
```

-continued

```
    if ( j < p ) then
        a[j + 1] ← a[j + 1] + 2
        if (j > 1 ) then a[j – 1] ← a[j – 1] + 1 endif
    else
        a[j + 1] ← a[j + 1] + 1
        if (j > 1) then a[j – 1] ← a[j – 1] + 2 endif
    endif
else if (–0.5 <= f_k(v) <= 0.5 ) then
    a[k] ← a[k] + 3
    a[k + 1] ← a[k + 1] + 1
    if (k > 1) then a[k – 1] ← a[k – 1] + 1 endif
endif
done
done
``` choose a[i] with the maximum value
outputs i as the class to which v belongs.

Herein after, three exemplary experiments will be described. One of the three experiments, the Fuzzy Membership Approach, is an experiment according to an embodiment of the present disclosure, the other two, Symbolic Regression Approach and IF-THEN Rules Inference Approach, are used for comparison to the Fuzzy Membership Approach and illustrate the ability of the Fuzzy Membership Approach to learn when the input to the learning process is incomplete (for example, at least one class is not represented by a training example). The Fuzzy Membership Approach will be described after the description of the other two approaches.

Before describing the exemplary experiments, a reference policy model, the Fuzzy MLS (Multilevel Security) Model used in all three experiments, the training and testing sets used in the experiments and the general concept of Genetic Programming (GP) are described first.

The Fuzzy MLS model is used throughout the experiments to illustrate the concept of policy learning. The Fuzzy MLS model is an adaptive extension to an MLS Bell-LaPadula policy model. In the MLS Bell-LaPadula model, every subject or object is assigned a security label (h: sensitivity level, i: categories set). For a read access r attempted by a subject to an object, the policy can be summarized as follows:

IF $sl \geq ol$ AND $sc \supseteq oc$ THEN r is allowed

Figure 2:
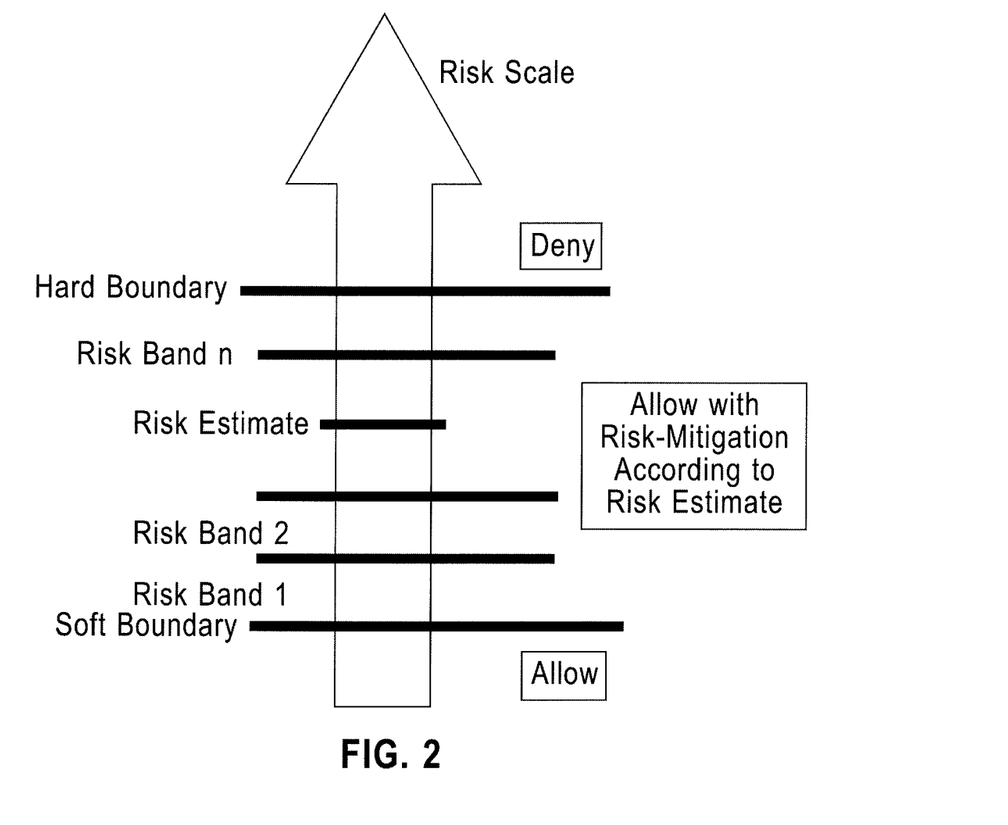
FIG. 2 illustrates risk adaptive access control according to an embodiment of the present disclosure.

IF $sl < ol$ OR $sc oc$ THEN r is denied    (1)

where sl and ol are subject and object sensitivity levels and sc and oc are subject and object category sets. In other words, a subject can access an object if the subject is trustworthy enough (sl≥ol) and has the legitimate "need-to-know" (sc $\supseteq$ oc) to access the object. In terms of risk, the MLS policy can be viewed as setting a fixed tradeoff between risk of information disclosure versus the benefit an organization can gain from it. It is a non-adaptive, binary access control decision model where accesses have been pre-classified as having either acceptable or unacceptable risk and only accesses with acceptable risk are allowed. The Fuzzy MLS model uses this risk based rationale, but extends the MLS model to be based on risk management rather than risk avoidance inherent in the binary decision process. The Fuzzy MLS model takes a more flexible and sophisticated view by determining quantified estimates of the risk from unauthorized disclosure of information and using these estimates to build a risk scale shown in FIG. 2. The risk scale is divided into multiple bands. Each band is associated with a decision. The risk in the bottom band is considered low enough so the decision is simply "allow" whereas the risk in the top band is considered too high so the decision is "deny". Each band between the top and bottom is associated with a decision allow with band-specific risk mitigation measures.

The Fuzzy MLS model defines risk as the expected value of damage caused by unauthorized disclosure of information:

$$\text{risk} = (\text{expected value of damage}) \times (\text{probability of unauthorised disclosure}) \quad (2)$$

The value of the damage is estimated from the object's sensitivity level. The probability of unauthorized disclosure is estimated by quantifying two "gaps": one between the subject's and the object's sensitivity levels and the other between the subject's and the object's category sets. For simplicity, this experiment looks only at the sensitivity levels and assumes the categories sets are the same, thus risk becomes a function of subject and object sensitivity levels only. A way to partition the risk bands (which is in turn associated with a decision) is defined to map an estimated risk to a risk band:

$$\text{band}(\text{risk}(sl,ol)) = \min(\lfloor \log_{10}(\text{risk}(sl,ol)) \rfloor, N-1) \quad (3)$$

The band numbers start from 0, N is the number of bands desired on the scale and the function risk(sl, ol) is defined in the Fuzzy MLS model. The intuition of using base-10 logarithm in Eq. (3) is to use a risk band number to represent the order of magnitude of risk. Since each band is associated with a decision, a risk band number determined using Eq. (3) represents a possible decision in the policy. Based upon this model, experiments have been conducted to assess the performance of three different Genetic Programming based approaches in learning (or inferencing) policies from decision examples.

The training sets and testing sets described here are used throughout the exemplary experiments described to allow consistent comparison. Each decision example x in the training or testing sets is a ($sl_x$, $ol_x$, $band_x$) triple, where bandx is calculated using Eq. (3). In other words, all the examples used are assumed to be correct. Three different training sets are used in each experiment. The first training set includes all possible 100 (sl, ol) pairs where sl and ol are integers in [0, 9]. This setting lends itself to act as the control. The second and third sets include 100 and 500 randomly generated (sl, ol) pairs where sl and ol are also integers in [0, 9]. Unlike in the control, these two sets would have incomplete coverage and uneven distribution of examples over risk bands. After going through the evolution process, a best individual in the population is selected to test against two sets of examples. The first set is same as the first 100-example training set. This testing set provides a good indication on how much "knowledge" has been acquired by the approach employed in a fixed number of generations. The second testing set includes 100 randomly generated (sl, ol) pairs where sl and ol are real numbers in [0.0, 9.0]. Therefore, most of these examples are unseen yet similar to training examples. This set provides a good measure on how much the acquired knowledge can be applied for unseen cases.

The GP learning process starts with a initial set of candidate functions, each such candidate is called an individual in GP terminology and corresponds to a policy. Candidate functions in the initial set are randomly generated. Each candidate function is a program represented by a tree structure that maps an (sl, ol) pair to a number representing a class. The leaf nodes in the tree correspond to variables or constants in the program and contain symbols from the terminal set T. The non-lead nodes in the tree correspond to operations on the variables and constants; these operations are from the function set F.

The GP process evaluates the fitness of each candidate function by feeding every example x in the training set to the function and comparing the output of the function with the class $band_x$ to which ($sl_x$, $ol_x$) belongs. The function is awarded with a positive fitness score if it outputs $band_x$ and is punished with a negative fitness score if it outputs a different value. The sum of these scores is the function's fitness score. Functions with higher fitness scores have a higher chance to produce children: new candidate functions generated from the current functions through GP operators. Two GP operators are used in the experiments: (1) crossover: combine two sub-trees from the tree representations of two functions, one sub-tree from each to form a new tree representation of a new function, and (2) mutation: randomly change the nodes in a function's tree representation to form a new function. The GP process evaluates all the children to produce the children's children and evaluates them. This evaluate-produce cycle is repeated until a function with a high-enough fitness score (beyond a pre-set threshold) is found; and this function is the learned policy. There is also a pre-set limit on the number of the cycles to prevent an infinite loop of repeating the "evaluate-produce" cycle. Each experiment has its own T and F sets and method to determine fitness scores which is described in the description of the experiment.

The following sections describe experiments done based upon each of these approaches in detail.

The Symbolic Regression Approach

In the symbolic regression approach, a policy is viewed as a function that maps decision making factors to a decision. For example, the part of the MLS Bell-LaPadula model that governs read access can be viewed as a boolean function access(sl, ol, sc, oc) which evaluates to True iff sl≥ol and sc ⊃oc. In the Fuzzy MLS model, this mapping function is the composition band and risk function in Eq. (3). Genetic Programming (GP) is used to learn (or search for) an equivalent function of this composition function. This is an exercise of symbolic regression based upon the decision examples. Since only the sensitivity levels are considered, the terminal set T has only two variables, namely sl and ol and a set of real constant numbers in the range of (−1, 1). In the function set F, 12 basic arithmetic operators are defined. These are +, −, *, /, exp, log, sin, cos, max, min, cell and floor. The/and exp operators defined are the conventional protected operators: division by 0 returns 1 and the exponential function returns the maximum value defined in the IEEE standard double precision (64-bits) floating point number if overflow happens.

Two principles are used to determine the fitness score for an output from an individual (a function). For an example x and an individual i, if i evaluates x to be in band j (j is i(x) rounded to the nearest integer), then:

For a correct decision, reward more the higher the risk band; i.e., reward higher j more than lower j.

For an incorrect decision, punish more the more the decision deviates from the target; i.e., punish more as |j−$band_x$| becomes larger. Also, punish under-estimation of the risk band more than over-estimation of it; i.e., punish more if $band_x$>j. Based upon these principles, the fitness of an individual i, fitness(i) is defined as follow:

$$\text{fitness}(i) = \sum_{\forall \text{ example } s} \text{score}(x) \quad (4)$$

where $$\text{score}(x) = \begin{cases} band_x + 1 & \text{if } j \equiv band_x, \\ -(band_x - j) & \text{if } band_x > j, \\ -(j - band_x)/2 & \text{if } band_x < j \end{cases}$$

The learned function may be imperfect; in certain cases the function may map a particular (sl, ol) pair to a value that is out of band range. When this happens, it can be assumed that all out-of-range values represent the highest band, e.g., any value not in the range [0, 9] is assumed to be 9. This is consistent with typical attitudes to security that favor overestimation of risk rather than underestimation. In a run-time deployment of an inference approach human interaction may be incorporated. For example, an alert would be given to the security administrator and the administrator would decide which band an input should be mapped to. Then, this decision can be used as a new training example.

The experiment setup is summarized in Table I. This experiment is carried out using the ECJ Framework v16 and the default values are used for unmentioned parameters.

TABLE I

| | |
|---|---|
| Objective | Search for the nearest equivalent function of band(risk(sl, ol)) in (3) |
| Terminal set T | {sl, ol} ∪ {r| − 1.0 < r < 1.0} |
| Function set F | {+, −, *, /, exp, log, sin, cos max, min, ceil, floor} |
| Fitness function $f_j(i)$ | fitness(i) in (4) |
| Number of generation | 500 |
| Population size | 1024 (default) |
| Population initialisation | Ramp half and half method with the minimum and maximum height of the tree set to be 2 and 6 respectively (default) |
| Genetic Operators | crossover, mutation, reproduction (default) |
| Maximum height of tree | 17 |

The IF-THEN Rules Inference Approach

In this experiment, an IF-THEN rules inference approach was taken. Here, an alternative view on policy is taken as a set of IF <condition> THEN <action> rules. Each rule is considered as a class, we shall use GP to search for the condition corresponding to a class with some particular action (e.g. "allow read"). Essentially, the security policy inference problem is transformed into a N-classes classification problem, in which N is the number of rules in the policy. GP is used to search for the condition part of each rule. Therefore, the number of GP runs equals the number of classes. In the Fuzzy MLS model, the risk scale is divided into 10 bands numbered from 0 to 9 and each band is a class. Therefore, 10 GP runs are required to search for conditions for all the bands. The target condition for band j, $TC_j$ to be learned is:

$$TC_j(sl,ol) = (band(risk(sl,ol)) \overset{\sim}{=} j) \quad (5)$$

Figure 3:
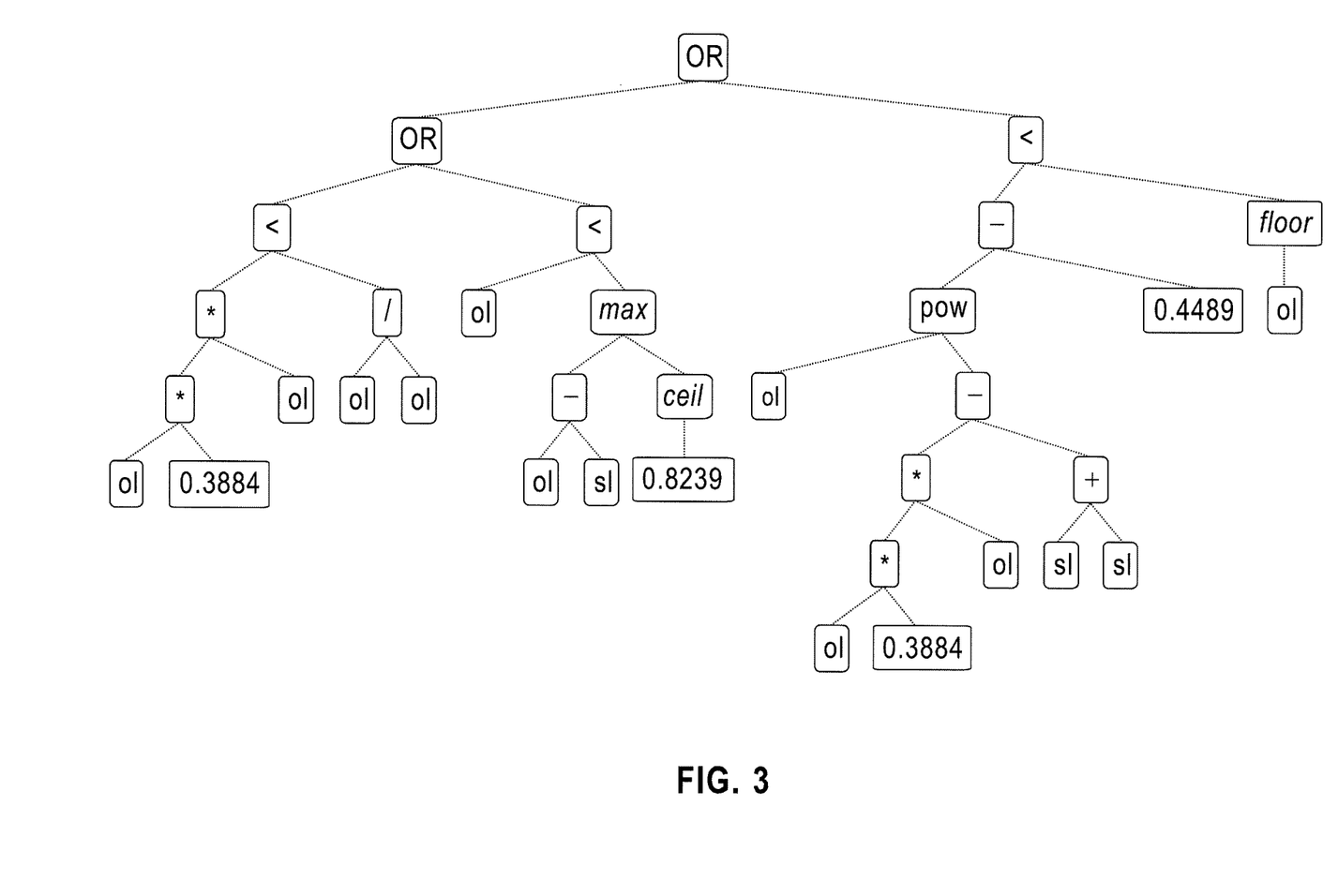
FIG. 3 is an example of a well-typed individual according to an embodiment of the present disclosure.

Each condition is a Boolean function represented by a tree. At the highest (nearest to the root) layer of the tree, there are composition operators, AND, OR and NOT The second layer includes logic relational operators such as < or =. The next layer includes arithmetic operators such as + or sin and the leaf nodes at the bottom layer are elements of the terminal set T. Thus, no Boolean nodes can have real numbers as their ancestors. Strongly Typed Genetic Programming (STGP) can be used to ensure this structure. FIG. 3 shows an example of well-typed individual.

The terminal set T has only two variables, namely sl and ol and a set of real constant numbers in the range of (−1, 1) is added to T. These elements are real numbers. There is an additional set of Boolean constants; True and False added to T. For real numbers, 15 operators are defined: 3 relational operators (=, < and >), each returns a Boolean value and 12 arithmetic operators (+, −, *, /, exp, log, sin, cos, max, min, ceil, floor), each returns a real number. Again, the / and exp operators defined are the conventional protected operators as described in the symbolic regression method. For the Boolean values, there are 3 operators, AND, OR and NOT defined, each returns a Boolean value.

As in the symbolic regression method, different scores are given to different kinds of decisions made by an individual according to the following four principles; two of them are the same as the principles for the symbolic regression method, the other two are added following the fact that this design allows us to distinguish between positive and negative decisions. In the search for the condition of band j, $TC_j$, let $d_{i,x}$ be the decision made by i for an example x, then:

For a correct decision, reward more if
  the risk is higher for security concerns; i.e., reward more for a larger j.
  the decision is true positive (hits the target); i.e., reward more when $band_x$ equals j and $d_{i,x}$ is True as compared to when $band_x$ does not equal j and $d_{i,x}$ is False. This is to overcome the effect of having relatively few examples in band j when j≠0 (less than 10% on average).

For an incorrect decision, punish more if
  the decision is false positive ($d_{i,x}$≡True and $band_x$≠j) and is more off the target; i.e., punish more as |j−$band_x$| becomes larger. Also, for security concerns, punish more if this false positive decision underestimates the risk; i.e., punish more if $band_x$>j.
  the decision is false negative ($d_{i,x}$≡False and $band_x$≡j) when the risk is higher for security concerns; i.e., punish more for a larger j.

Based upon these four principles, the fitness score for an individual in the search for the condition of band j, $fitness_j(i)$ is defined as:

$$fitness_j(i) = \sum_{\{x|band_x=j\}} w_{tp}\{d_{i,x} \equiv \text{True}\} + \sum_{\{x|band_x \neq j\}} w_{tn}\{d_{i,x} \equiv \text{False}\} - \quad (6)$$

$$\sum_{\{x|band_x \neq j\}} w_{fp}\{d_{i,x} \equiv \text{True}\} - \sum_{\{x|band_x = j\}} w_{fn}\{d_{i,x} \equiv \text{False}\}$$

where $w_{tp} = j + 1,$
$w_{tn} = (j+1)/10,$
$w_{fp} = \begin{cases} band_x - j & \text{if } band_x > j, \\ (j - band_x)/2 & \text{if } band_x < j, \end{cases}$
$w_{fn} = j + 1$ Referring to policy resolution; When two or more TC evaluated to True, the highest band with TC≡True is selected for security concerns. Formally, if $TC_j$≡True and $TC_k$≡True and j>k, then band j instead of band k is used. Also, if there is no TC evaluated to True, the highest band is used again for the same reason. An alternative implementation which involve human decision making can also be used instead. Then, this decision can be used as a new training example.

The experiment setup is summarized in Table II. As described with respect to the IF-THEN rules inference approach, this experiment is carried out using the ECJ Framework v16 and the default values are used for unmentioned parameters.

TABLE II

| | |
|---|---|
| Objective | Search for the equivalent functions of TC for all bands, ∀j ∈[0, 9], $TC_j$ in (5) |
| Terminal set T | {sl, ol} ∪ {r| − 1.0 < r < 1.0} ∪ {TRUE, FALSE} |

TABLE II-continued

| | |
|---|---|
| Function set F | {+, −, *, /, exp, log, sin, cos max, min, ceil, floor} ∪{AND, OR, =, >, <} |
| Fitness function $f_j(i)$ | fitness(i) in (6) |
| Number of generation | 500 |
| Population size | 1024 (default) |
| Population initialisation | Ramp half and half method with the minimum and maximum height of the tree set to be 2 and 6 respectively (default) |
| Genetic Operators | crossover, mutation, reproduction (default) |
| Maximum height of tree | 17 |

The Fuzzy Membership Approach

Another exemplary experiment is the fuzzy membership approach. In this approach a degree of smoothing is applied to a search space by adopting a fuzzy-inspired approach. Each risk band is treated as a fuzzy set and search for each band j a fuzzy membership function $M_j(sl, ol)$, whose output value indicates the likelihood of risk(sl, ol) belonging to band j. Later these band membership functions are used to determine a most appropriate band for given input (sl, ol).

To guide the learning of the fuzzy set membership function for band j, $M_j(sl, ol)$, the target membership of each of the 10 bands in the band j fuzzy set is first defined. Essentially, these 10 pre-defined points characterize the shape and location of the $M_j$ curve. The learning process becomes a curve fitting exercise to search for a curve that best fits the 10 points, using all the examples in the training set. Curve fitting is more tolerant of incomplete coverage in the training set because it uses interpolation and extrapolation to compensate for the missing points. It is also more resilient to a few out-liars in the training set. Furthermore, the fuzzy membership range is changed to [−1.0, 1.0] with 0.0 represents full membership. This is different from the traditional fuzzy membership range, [0.0, 1.0] with 1.0 representing full membership. The expansion on the negative range allows the information about the direction (left or right to the target band) to be encoded. For example, for $M_5(sl, ol)$, the target membership of each band, starting from band 0, can be defined as:

[−0.5,−0.4,−0.3,−0.2,−0.1,0.0,0.1,0.2,0.3,0.4]

Band 5 has membership 0. The target memberships for other $M_{j\neq 5}$ can be similarly defined. With all 10 membership functions learned, the band of an input can be determined by feeding the input to all 10 functions and determining the band number by examining the 10 membership values returned by these functions. For example, if each membership value indicating that "the distance between the input and my band places the input close to band 5", then with very high confidence we can say the input belongs to band 5. This is analogous to examine the input from 10 different perspectives to draw the final conclusion, which is more likely to be accurate than examining the input from one perspective. Two setups with different pre-defined target memberships are carried out to validate this concept. In the first setup the 10 target memberships for $M_j$ are defined as:

$$M_j(k)=(k-j)/10, k=0 \text{ to } 9 \quad (7)$$

Figure 4:
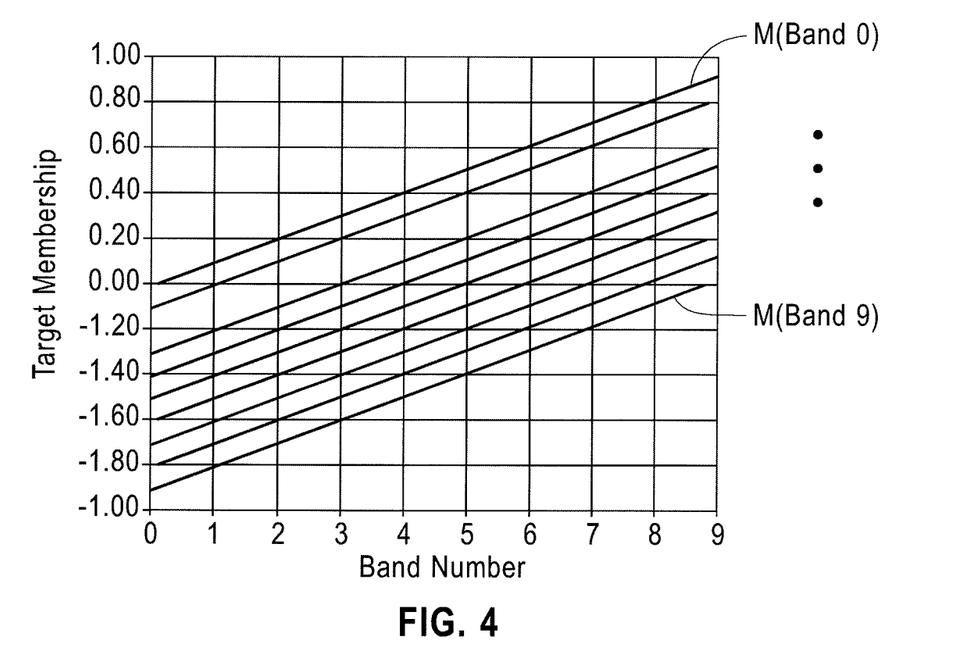
FIG. 4 illustrates linear membership functions according to an embodiment of the present disclosure.
Figure 5:
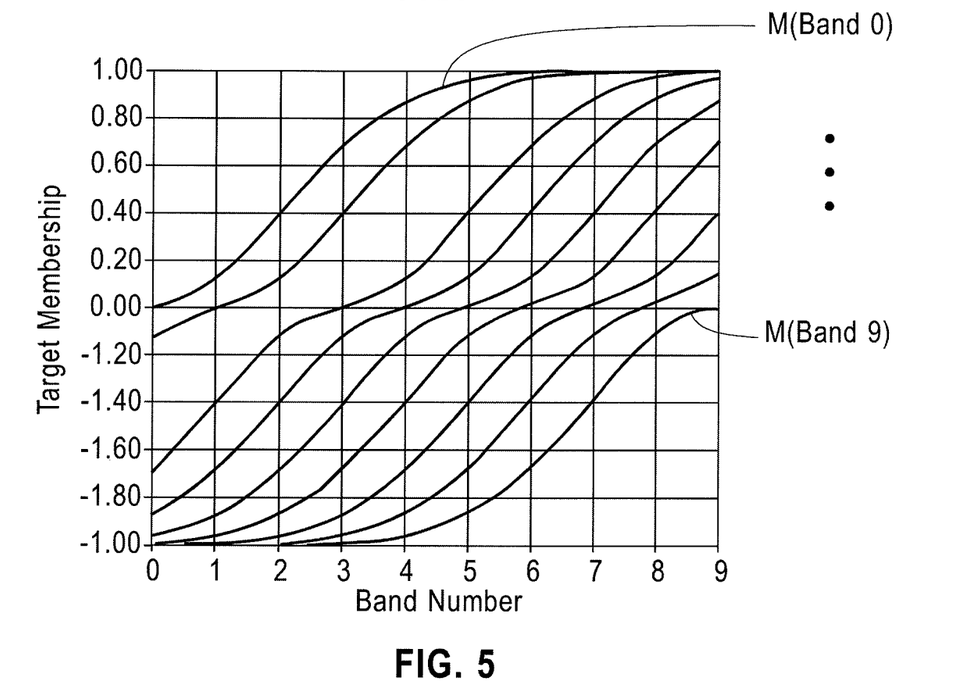
FIG. 5 illustrates curve membership functions according to an embodiment of the present disclosure.

This is like mapping a traditional triangle fuzzy membership function, which has the range [0, 1] and $M_j(j)=1$ as the tip of the triangle, to a straight-line membership function with the range [−1, 1] and $M_j(j)=0$. FIG. 4 shows the target membership curves for all 10 bands using Eq. (7). In the second setup, bell-shaped Gaussian distribution curves are mapped in a similar fashion and FIG. 5 shows the membership curves for all 10 bands.

Once all 10 membership functions are learned and feeding an input $x\equiv(sl_x, ol_x)$ to these functions, a de-fuzzification mechanism is required to map all 10 values returned by these functions to a risk band number. Two voting based algorithms are used for de-fuzzification: One (Algorithm 1) uses the direction knowledge only and the other one (Algorithm 2) uses both the direction and distance knowledge.

---
Algorithm 1: Direction based de-fuzzification
--- initialise an array u[10] with all elements set to 0
forall example x do
  | forall band j do
  |  | if $M_j(sl_x, ol_x) > 0.05$ then
  |  |  | forall k > j do
  |  |  |  |- u[k] ← u[k] + 1
  |  | else if $M_j(sl_x, ol_x) < -0.05$ then
  |  |  | forall k < j do
  |  |  |  |- u[k] ← u[k] + 1
  |  | else if $-0.05 \leq M_j(sl_x, ol_x) \leq 0.05$ then
  |  |  | u[j] ← [j] + 1
  | |_
|_
choose u[i] with the maximum value
outputs i as the risk band number ---
Algorithm 2: Direction and distance based de-fuzzification
--- initialise an array u[10] with all elements set to 0
forall example x do
  | forall band j do
  |  | if $M_j(sl_x, ol_x) > 0.05$ then
  |  |  | p ← j + $M_j(x)$ * 10
  |  |  | k ← min([p + 0.5], 9)
  |  |  | u[k] ← u[k] + 3
  |  |  | if k > p then
  |  |  |  | u[k − 1] ← u[k − 1] + 2
  |  |  |  | u[k + 1] ← u[k + 1] + 1
  |  |  | else
  |  |  |  | u[k − 1] ← u[k − 1] + 1
  |  |  |  |- u[k + 1] ← u[k + 1] + 2
  |  | else if $M_j(sl_x, ol_x) < -0.05$ then
  |  |  | p ← j + $M_j(x)$ * 10
  |  |  | k ← max([p − 0.5], 0)
  |  |  | u[k] ← u[k] + 3
  |  |  | if k < p then
  |  |  |  | u[k + 1] ← u[k + 1] + 2
  |  |  |  | u[k − 1] ← u[k − 1] + 1
  |  |  | else
  |  |  |  | u[k + 1] ← u[k + 1] + 1
  |  |  |  |- u[k − 1] ← u[k − 1] + 2
  |  | else if $-0.05 \leq M_j(sl_x, ol_x) \leq 0.05$ then
  |  |  | u[j] ← u[j] + 3
  |  |  | u[j + 1] ← u[j + 1] + 1
  |  |  | u[j − 1] ← u[j − 1] + 1
  | |_
|_
choose u[i] with the maximwn value
outputs i as the risk band number In this experiment, the terminal set T includes sl, ol and a set of random real constant numbers in the range of (−1, 1) whereas the function set F is reduced to {+, −, *, /, exp, log, sin, cos max, min, coil, floor} just as in the symbolic regression approach. The individual structure used here is also similar as in the symbolic regression approach, but they represent two different things. Each individual here resembles the membership function for the band in question whereas an individual in the symbolic regression approach resembles a function that corresponds to the policy as a whole.

The fitness function uses per-band normalized distance: let $M_{j,i}$ represent an individual i in the search for the membership function for band j, the individual fitness, $fitness_j(i)$ is defined as follow:

$$fitness_j(i) = \sum_{\forall\ bands\ k=0\ to\ 9} score_k(x) \qquad (8)$$

where $$score_k(x) = \frac{\sum_{\forall x\ in\ band\ k} |M_{j,i}(sl_x, ol_x) - M_j(band_k)|}{total\ number\ of\ band\ k\ examples}$$

Thus, the $fitness_j(i)$ represents the sum of normalized distances between the $M_{j,i}$ and $M_j$. In contrast to the previous two experiments, here smaller $fitness_j(i)$ means better fit.

The experiment setup is summarized in Table III. This experiment is carried out using the ECJ Framework v16 and the default values are used for unmentioned parameters.

TABLE III

| Objective | Search for the fuzzy membership functions for all bands, $\forall j \in [0, 9]$, $M_j$ characterised by the examples in the training set |
|---|---|
| Terminal set T | {sl, ol} ∪ {r | −1.0 < r < 1.0} |
| Function set F | {+, −, *, /, exp, log, sin, cos max, min, ceil, floor} |
| Fitness function $f_j(i)$ | $fitness_j(i)$ in (8) |
| Number of generation | 500 |
| Population size | 1024 (default) |
| Population initialisation | Ramp half and half method with the minimum and maximum height of the tree set to be 2 and 6 respectively (default) |
| Genetic Operators | crossover, mutation, reproduction (default) |
| Maximum height of tree | 17 |

Each experiment is repeated for 10 times using different random seeds. The average of the policy performances over the 10 runs in terms of the distance from the target band is summarized in the Table IV. In general, the experiments using fuzzy membership approach consistently perform the best in terms of accuracy on both the discrete and continuous testing sets, the experiments using IF-THEN rules approach have good performances on discrete testing set, but poor performances on continuous testing set and the experiments using the symbolic regression approach have poor performances on both testing sets. The poor performances of the experiments using the symbolic regression approach can be explained from the function used in partitioning the risk scale (3) which results in uneven distribution of the examples in the training sets. The output band is strongly correlated to one of the inputs, ol. Approximately half of the training examples are mapped to band equal to ol. This becomes a high local optimum point which is difficult to escape. Indeed, a careful analysis on result reveals it is the case that the best function (policy) learned maps every possible input pairs to of in one third of the total runs. Another local optimum is the function that maps every possible input pairs to band 0.

In the experiments using IF-THEN rules inference approach, the performances of the policies improve on the discrete testing set (Testing Set 1). The policy performances also improve as the training set size increases. In particular, the policy learned using 500 random examples performs extremely well, it maps 93.8 examples in average to the bands correctly and the mean distance between the target bands and the results is 0.348. This is because the high local optimum points are removed by design (band=ol) or the use of the weighted function (band=0). However, the performance of the policies on continuous testing set (Training Set 2) does remain similar to the policies learned using symbolic regression approach. Furthermore, analysis on the outputs of these two approaches show that there are numerous unusual cases such that some (sl, ol) pairs with (high, low) values are mapped to band 9 (the highest band in our case). This suggests that the policy resolution mechanism has taken placed. In other words, policies learned are incomplete. This pessimistic policy resolution mechanism degrades the performance significantly.

The experiments using fuzzy membership approach consistently have the best performance in terms of accuracy on both the discrete and continuous testing sets. Also, the de-fuzzification method that uses both direction and distance information improves the performance of the experiments using the mapped triangle based fuzzification, the mean distance from the target for all cases is reduced to less than 0.8. However, this new de-fuzzification method degrades the performance of the experiments using the mapped Gaussian curve based fuzzification. This is because the de-fuzzification method makes the assumption that the distance from the target increases linearly in respect to the membership value. This is not the case in Gaussian curve based fuzzification. A possible further work is to design a compatible de-fuzzification mechanism using both distance and direction for Gaussian curve fuzzification.

TABLE IV

| | | | Distance from target band | | | | |
|---|---|---|---|---|---|---|---|
| Experiment | Training set | Testing set | 0 | 1 | 2 | ≥3 | Mean distance |
| Symbolic Regression | 1 | 1 | 62.3 | 9.6 | 6.0 | 22.1 | 1.248 |
| | | 2 | 43.6 | 20.7 | 7.3 | 28.4 | 1.703 |
| | 2 | 1 | 71.9 | 8.0 | 4.2 | 15.9 | 0.895 |
| | | 2 | 52.3 | 21.0 | 5.7 | 21.0 | 1.411 |
| | 3 | 1 | 63.2 | 10.7 | 5.7 | 20.4 | 1.203 |
| | | 2 | 38.5 | 29.5 | 7.5 | 24.5 | 1.667 |
| IF-THEN Rules | 1 | 1 | 88.1 | 0.4 | 0.7 | 10.8 | 0.797 |
| | | 2 | 48.1 | 19.0 | 5.5 | 27.4 | 1.831 |
| | 2 | 1 | 82.7 | 3.7 | 2.3 | 11.3 | 0.746 |
| | | 2 | 52.7 | 20.9 | 5.4 | 21.0 | 1.500 |
| | 3 | 1 | 93.8 | 0.4 | 0.0 | 5.8 | 0.348 |
| | | 2 | 49.6 | 20.9 | 4.5 | 25.0 | 1.824 |
| Mapped triangle (Direction only) | 1 | 1 | 50.7 | 26.4 | 11.5 | 11.4 | 0.868 |
| | | 2 | 40.5 | 33.0 | 13.1 | 13.4 | 1.076 |
| | 2 | 1 | 56.3 | 23.9 | 9.2 | 10.6 | 0.826 |
| | | 2 | 45.0 | 31.7 | 8.6 | 14.7 | 1.056 |

TABLE IV-continued

| Experiment | Training set | Testing set | Distance from target band | | | | Mean distance |
| --- | --- | --- | --- | --- | --- | --- | --- |
| | | | 0 | 1 | 2 | ≥3 | |
| | 3 | 1 | 53.9 | 23.5 | 11.1 | 11.5 | 0.863 |
| | | 2 | 43.4 | 36.6 | 10.9 | 9.1 | 0.921 |
| Mapped Gaussian curve (Direction only) | 1 | 1 | 63.9 | 20.6 | 8.3 | 7.2 | 0.620 |
| | | 2 | 51.8 | 29.7 | 12.7 | 5.8 | 0.757 |
| | 2 | 1 | 56.9 | 20.9 | 14.4 | 7.8 | 0.772 |
| | | 2 | 41.8 | 25.4 | 18.9 | 13.9 | 1.173 |
| | 3 | 1 | 71.4 | 19.4 | 6.7 | 2.5 | 0.414 |
| | | 2 | 60.1 | 24.2 | 9.2 | 6.5 | 0.638 |
| Mapped triangle | 1 | 1 | 91.6 | 4.8 | 1.0 | 2.6 | 0.178 |
| | | 2 | 62.2 | 23.5 | 3.6 | 10.7 | 0.781 |
| | 2 | 1 | 76.0 | 13.3 | 3.6 | 7.1 | 0.514 |
| | | 2 | 62.1 | 23.9 | 4.8 | 9.2 | 0.634 |
| | 3 | 1 | 78.5 | 10.8 | 2.5 | 8.2 | 0.535 |
| | | 2 | 58.8 | 27.3 | 3.4 | 10.5 | 0.782 |
| Mapped Gaussian curve | 1 | 1 | 65.5 | 14.4 | 9.6 | 10.5 | 0.696 |
| | | 2 | 52.6 | 18.8 | 12.7 | 15.9 | 1.013 |
| | 2 | 1 | 62.6 | 14.6 | 9.2 | 13.6 | 0.916 |
| | | 2 | 47.9 | 17.6 | 11.9 | 22.6 | 1.492 |
| | 3 | 1 | 65.4 | 14.5 | 9.0 | 11.1 | 0.707 |
| | | 2 | 50.3 | 19.7 | 12.3 | 17.7 | 1.097 |

As described herein different exemplary GP based approaches have been described in which policies can be inferred from a set of previously made decision examples. These exemplary approaches are symbolic regression, IF-THEN rules inference, and fuzzy membership approaches. The fuzzy membership approach is found to have better accuracy in terms of "Mean distance" in Table IV, wherein "distance" is the absolute value of the difference between an input vector's class and the class to which the classifier maps the vector; and the mean distance is the mean value of the differences for all vectors in a training set. A smaller mean distance implies higher accuracy. The "Mapped triangle" experiment of the fuzzy membership approach in Table W has the smallest mean distances and therefore the highest accuracy. The "Mapped Gaussian curve" experiment of the fuzzy membership approach has a lower accuracy because the particular de-fuzzification method is not designed for the classes' fuzzy memberships assigned according to the shape of the mapped Gaussian curve. This shows the de-fuzzification method must be designed according to the fuzzy membership assignment. Security policy inference is an exemplary domain in which evolutionary algorithms can be employed.

Referring to the risk determination; risk is defined as the expected value of damage. The risk resulted from the "gap" between a subject's and an object's sensitivity levels (sl and ol) is estimated using the following formula:

$$risk(sl,ol) = Val(ol) \times P_1(sl,ol) \quad (9)$$

Val(ol) is the estimate value of damage incurred when the information in the object is leaked as $$Val(ol) = a^{ol}, a > 1$$

The object sensitivity level is considered to be the order of magnitude of damage and hence Val(ol) is defined as an exponential formula. In the experiments a is set to be 10. $P_1(sl, ol)$ is the probability of unauthorized disclosure (information leakage) and is defined as a sigmoid function:

$$P_1(sl, ol) = \frac{1}{1 + \exp(-k(TI(sl, ol) - mid))}$$

TI(sl, ol) is called the temptation index which indicates how much the subject with sensitivity sl is tempted to leak information with sensitivity level ol; it is defined as:

$$TI(sl, ol) = \frac{a^{(ol-sl)}}{M - ol}$$

The intuition for $P_1$(sl, ol) and TI(sl, ol):

The value mid is the value of TI that makes $P_1$ equal 0.5; the value k controls the slope of $P_1$. The value M is the ultimate object sensitivity and the temptation TI approaches infinity as ol approaches M; the intuition is that access to an object that is as sensitive as or more sensitive than M should be controlled by human beings and not machines In our experiments, the maximum value for sl and ol is 10; the settings for k, mid and M are k=3, mid=4, M=11.

It is to be understood that embodiments of the present disclosure may be implemented in various forms of hardware, software, firmware, special purpose processors, or a combination thereof. In one embodiment, a software application program is tangibly embodied on a program storage device. The application program may be uploaded to, and executed by, a machine comprising any suitable architecture.

Figure 6:
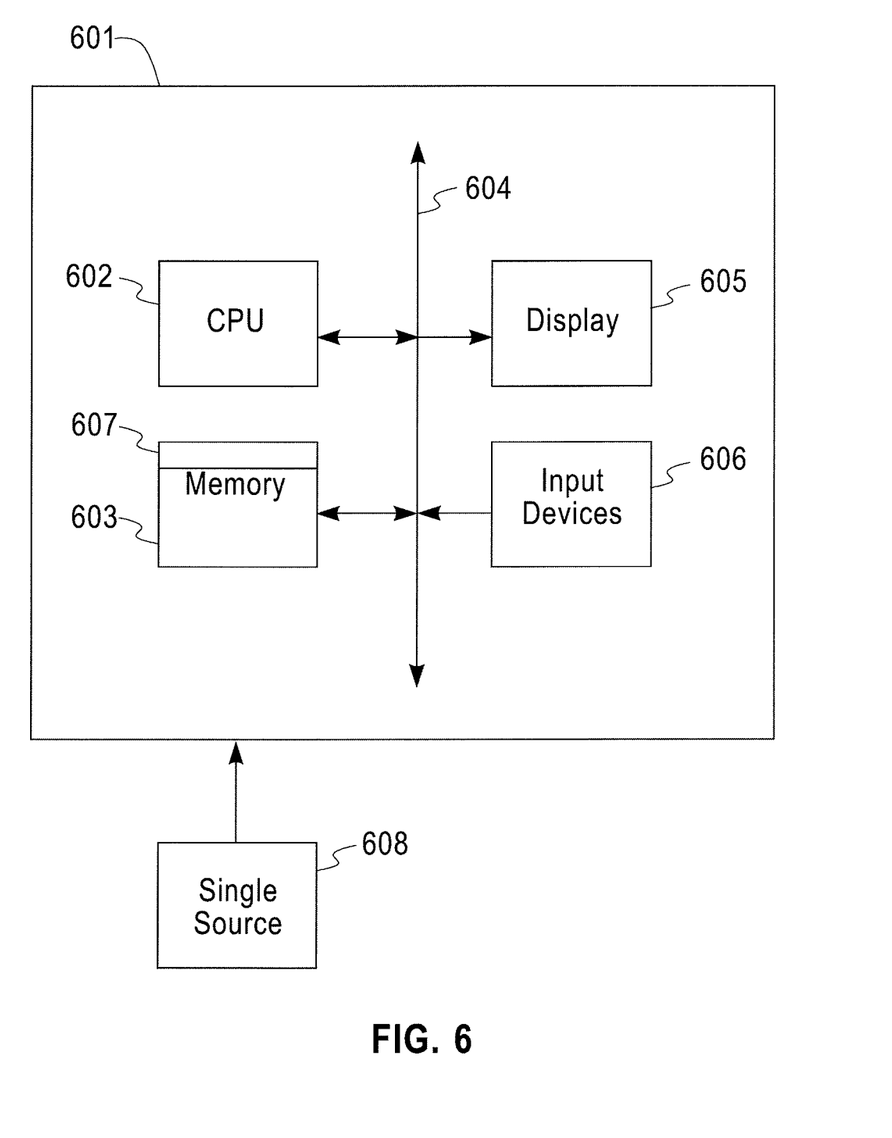
FIG. 6 is an exemplary computer system for executing a program of instructions for policy evolution with genetic programming according to an embodiment of the present disclosure.

Referring now to FIG. 6, according to an embodiment of the present disclosure, a computer system 601 for learning policy through machine learning techniques can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process a signal from instruments 609 attached to a data communications bus 608. As such, the computer system 601 is a general purpose computer system that becomes a specific purpose computer system when executing the routine 607 of the present disclosure.

The computer platform 601 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for a system and method for policy evolution with genetic programming, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented classification method, the method comprising:
   receiving a plurality of training examples, wherein each training example is an input vector belonging to one class of a set of N classes, wherein N is at least 2;
   learning a set of N functions, wherein each function corresponds to a respective class of the N classes and is characterized by the input vectors belonging to the respective class,
   wherein the learning comprises for each class:
      determining a sequence of N values that is unique with respect to the other sequences for the other classes;
      generating points for each input vector belonging to the class, the points comprising the corresponding input vector and a value of the sequence; and
      generating a corresponding one of the N functions for the class by fitting a curve through the points;
   inputting a new input vector to each of the N functions to generate N outputs; and
   classifying the new input vector based on a combination of the N outputs.

2. The method as recited in claim 1, wherein the new input vector includes m elements v=<v1 . . . vm>.

3. The method as recited in claim 2, wherein the elements of the new input vector are of a same type or different types.

4. The method as recited in claim 1, wherein each function maps the new input vector to the respective class of the set of N classes according to a plurality of values determined for a respective plurality of elements of the respective class.

5. The method as recited in claim 1, wherein each function has respective numerical values pre-assigned to each class.

6. The method as recited in claim 4, wherein each function has respective numerical values pre-assigned to each class.

7. The method as recited in claim 1, wherein the class for the new input vector is determined through combining numerical outputs of the functions with a voting method, wherein votes are cast for one or more classes to which the new input vector most likely belongs according to the numerical outputs.

8. The method as recited in claim 1, where each sequence includes at least three numbers.

9. A non-transitory program storage device embodying instructions executable by a processor to perform a classification method, the method steps comprising:
   receiving a plurality of training examples, wherein each training example is an input vector belonging to one class of a set of N classes, wherein N is at least 2;
   learning a set of N functions, wherein each function corresponds to a respective class of the N classes and is characterized by the input vectors belonging to the respective class,
   wherein the learning comprises for each class:
      determining a sequence of N values that is unique with respect to the other sequences for the other classes;
      generating points for each input vector belonging to the class, the points comprising the corresponding input vector and a value of the sequence; and
      generating a corresponding one of the N functions for the class by fitting a curve through the points;
   inputting a new input vector to each of the N functions to generate N outputs; and
   classifying the new input vector based on a combination of the N outputs.

10. The program storage device as recited in claim 9, wherein the new input vector includes m elements v=<v1 . . . vm>.

11. The program storage device as recited in claim 10, wherein the elements of the new input vector are of a same type or different types.

12. The program storage device as recited in claim 9, wherein each function maps the new input vector to the respective class of the set of N classes according to a plurality of values determined for a respective plurality of elements of the respective class.

13. The program storage device as recited in claim 9, wherein each function has respective numerical values pre-assigned to each class.

14. The program storage device as recited in claim 12, wherein each function has respective numerical values pre-assigned to each class.

15. The program storage device as recited in claim 9, wherein the class for the new input vector is determined through combining numerical outputs of the functions with a voting method, wherein votes are cast for one or more classes to which the new vector most likely belongs according to the numerical outputs.

16. The program storage device as recited in claim 9, where each sequence includes at least three numbers.

17. A computer-implemented method for constructing a classifier for mapping a new input vector to one of three pre-defined classes comprising:
   receiving a plurality of training examples, wherein each training example is an input vector belonging to one of the three pre-defined classes;
   learning three functions, wherein each function maps the input vectors to a numerical value by a curve characterized by elements in the training examples; and
   determining a class among the three pre-defined classes for a vector to be classified by combining numerical outputs of the three functions given the vector, wherein each of the numerical outputs is a selection of a class from among the three classes from a perspective one of the respective functions, wherein the curve of each function is derived from points based on a different unique sequence of three sequential values associated with one of the classes and the elements in the training examples belonging to the same one class.

18. The method of claim 17, wherein the combination of the numerical outputs is a voting method.

* * * * *